(12) United States Patent
Hartmann et al.

(10) Patent No.: US 11,323,952 B2
(45) Date of Patent: May 3, 2022

(54) METHODS AND DEVICES FOR MULTIPLE ATTACHMENT OF A MOBILE TERMINAL TO ACCESS POINTS IN SHARED RISK GROUPS

(71) Applicant: ORANGE, Issy-les-Moulineaux (FR)

(72) Inventors: Charles Hartmann, Chatillon (FR); Antoine Mouquet, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 17/046,326

(22) PCT Filed: Apr. 3, 2019

(86) PCT No.: PCT/FR2019/050771
§ 371 (c)(1),
(2) Date: Oct. 9, 2020

(87) PCT Pub. No.: WO2019/197752
PCT Pub. Date: Oct. 17, 2019

(65) Prior Publication Data
US 2021/0099946 A1 Apr. 1, 2021

(30) Foreign Application Priority Data
Apr. 11, 2018 (FR) ...................................... 1853144

(51) Int. Cl.
*H04W 48/10* (2009.01)
*H04W 48/20* (2009.01)

(52) U.S. Cl.
CPC ........... *H04W 48/10* (2013.01); *H04W 48/20* (2013.01)

(58) Field of Classification Search
CPC ...... H04W 48/10; H04W 24/04; H04W 48/20
See application file for complete search history.

(56) References Cited

U.S. PATENT DOCUMENTS

| 2005/0090283 A1* | 4/2005 | Rodriquez | .............. H04L 67/12 455/552.1 |
| 2013/0244648 A1* | 9/2013 | Singh | .................... H04W 48/12 455/435.1 |

(Continued)

FOREIGN PATENT DOCUMENTS

| CA | 2350449 A1 | 12/2002 |
| EP | 2739081 A1 | 6/2014 |

OTHER PUBLICATIONS

English translation of the Written Opinion of the International Searching Authority dated Jun. 27, 2019 for corresponding International Application No. PCT/FR2019/050771, filed Apr. 3, 2019.

(Continued)

*Primary Examiner* — Qutbuddin Ghulamali
(74) *Attorney, Agent, or Firm* — David D. Brush; Westman, Champlin & Koehler, P.A.

(57) ABSTRACT

A method for multiple attachment of a mobile terminal to access points of a plurality of access points to at least one cellular network. The method is implemented by the terminal and includes: reception of messages diffused by access points of the plurality of access points, including an identifier relating to the pertaining of a resource used by the respective access point, called a GRP identifier, to a shared risk group; first attachment of the terminal to a first access point of the plurality of access points; and second attachment of the terminal to a second access point of the plurality of access points, selected according to the GRP identifier thereof and the GRP identifier of the first access point.

13 Claims, 4 Drawing Sheets

(56) References Cited

U.S. PATENT DOCUMENTS

Figure 1:
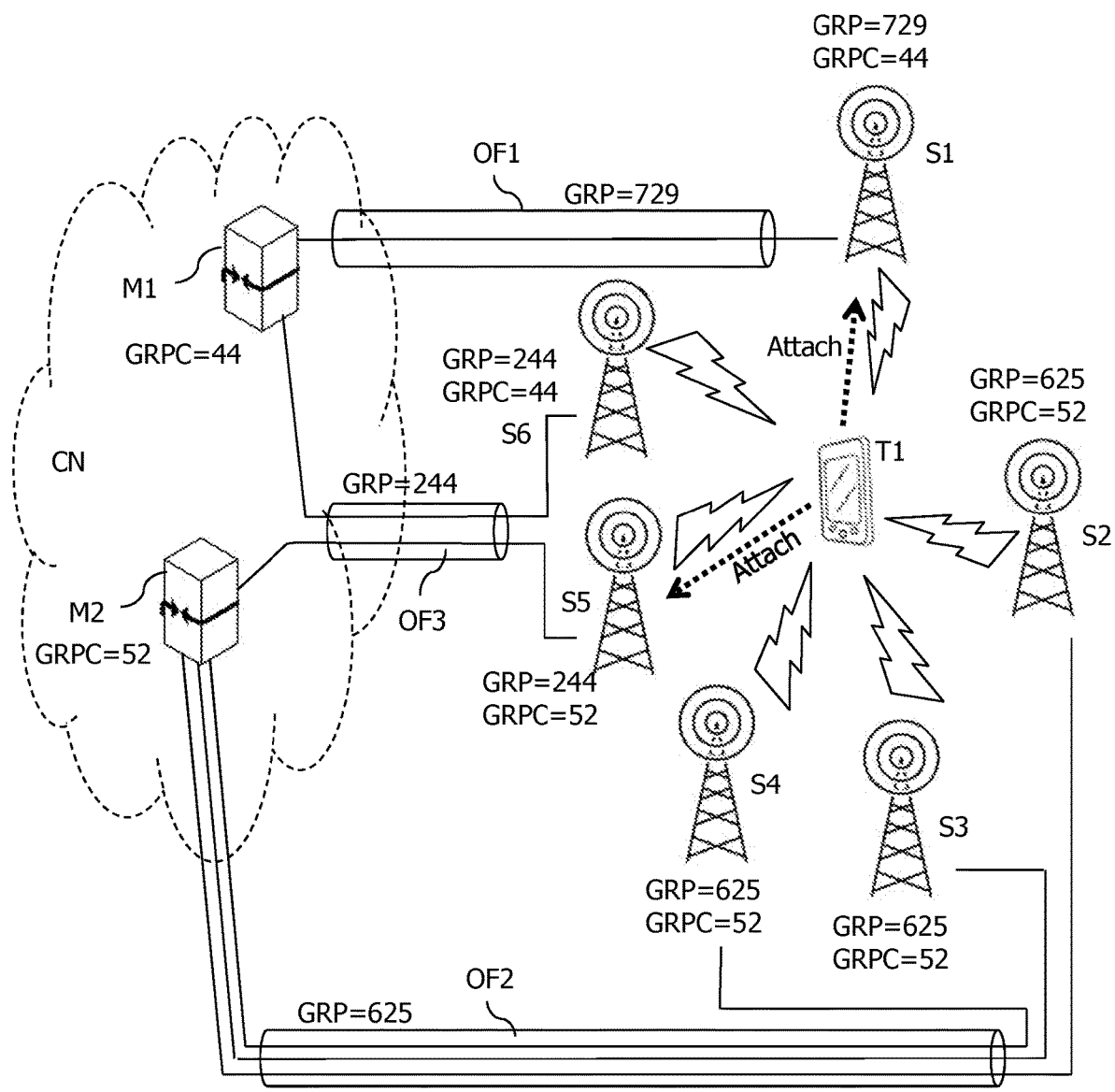

2015/0319618 A1* 11/2015 Zhang .................. H04W 12/08
            370/329
2015/0319628 A1* 11/2015 Elliott .................. H04W 76/19
            370/225

OTHER PUBLICATIONS

International Search Report dated May 20, 2019 for corresponding International Application No. PCT/FR2019/050771, filed Apr. 3, 2019.
Written Opinion of the International Search Report dated May 20, 2019 for corresponding International Application No. PCT/FR2019/050771, filed Apr. 3, 2019.

* cited by examiner

METHODS AND DEVICES FOR MULTIPLE ATTACHMENT OF A MOBILE TERMINAL TO ACCESS POINTS IN SHARED RISK GROUPS

CROSS-REFERENCE TO RELATED APPLICATIONS

This Application is a Section 371 National Stage Application of International Application No. PCT/FR2019/050771, filed Apr. 3, 2019, which is incorporated by reference in its entirety and published as WO 2019/197752 A1 on Oct. 17, 2019, not in English.

1. FIELD OF THE INVENTION

The invention relates to the field of cellular networks and more particularly that of the availability rate of a telecommunications service through the attachment of a mobile terminal to a plurality of access points of a cellular network at the same time.

2. PRIOR ART

One conventional way of increasing the availability rate of a telecommunications service is to implement dual attachment of the terminal installation to the network. For example, a company private branch exchange may be connected to the public network via two separate links. However, in order to achieve an increase in the availability of the service, it is necessary for these two connection links not to share the same risks following the failure of a common resource. It is ensured for example that they pass through different building and trench penetrations, take separate network routes and terminate at different splitters, connection units or switches.

In the prior art, the engineer responsible for designing the connection of the terminal installation ensures that the two links that are set up use independent physical infrastructures and network equipment. This is a simple operation for terminal installations connected in a wired manner, but this method is not able to be adapted to cellular networks, for which the point of attachment of a terminal to the network is liable to change at any time.

There are already cellular terminals capable of implementing dual attachment to one (or more) network(s); these are typically terminals with two SIM cards. However, the dual attachment is intended not to increase the availability of the service, but to simultaneously benefit from the respective services associated with the two SIM cards (for example being reachable on two numbers). Such terminals do not have any visibility regarding the diversity of the network resources that are used and therefore do not have the possibility of ensuring that the two attachments do not share the same risks. They could take action to select two different cells for each of the attachments by looking at the "Cell ID" parameter broadcast by each cell, but it is entirely possible for the two selected cells to be carried by the same base station, or two base stations located on the same site and sharing the same physical resources for connection to their collection network and then to the core network, or for their energy supply.

For example, each base station has its own optical fiber connections, but the optical fibers share one and the same cable, duct or civil engineering component. Alternatively, the base stations belong to 2 different operators but are jointly located on the same site and share the same connection link from the radio site to the collection network. One of the aims of the invention is to remedy these drawbacks of the prior art.

3. DISCLOSURE OF THE INVENTION

The invention aims to improve the situation by way of a method for the multiple attachment of a mobile terminal to access points of a plurality of access points to one or more cellular networks, the method being implemented by the terminal and comprising the following steps:
 receiving messages broadcast by access points of the plurality, comprising an identifier relating to the fact that a resource used by the respective access point belongs to a shared risk group, called GRP identifier,
 first attachment of the terminal to a first access point of the plurality,
 second attachment of the terminal to a second access point of the plurality, selected on the basis of its GRP identifier and of the GRP identifier of the first access point.

In the prior art, mobile terminals and cellular networks do not use and do not exchange information relating to the existence of a shared risk in terms of availability. By virtue of the invention, a mobile terminal already attached to the cellular network through an access point such as a base station, and wishing to set up or modify another attachment through another base station, will be able to take action such that this other base station is selected so that it does not use a resource exhibiting the same risks as the first base station, that is to say does not use a resource that is in the same shared risk group. A malfunction affecting this resource will thus affect only one of the two base stations, and at least one of the connections established by the terminal by virtue of its attachments will not be affected.

It is understood that one of the aims sought by the method according to the invention is to diversify the shared risk groups used by the terminal.

When two base stations broadcast different GRPs, this indicates the absence of a common risk between them, linked to the diversity of the resources used, or to the absence of common elements in these resources.

When two base stations broadcast identical GRPs, this indicates the existence or at least the high probability of the existence of a shared risk factor, due to the use of one and the same sometimes critical resource.

The GRPs are integers, for example coded on 16, 32 or 48 bits. They may also be alphanumeric character strings.

According to one aspect of the attachment method, it furthermore comprises a step of comparing the GRP identifier of the first access point and the GRP identifiers of the other access points of the plurality, one of the other access points being selected as the second access point if its GRP identifier is different from that of the first access point.

In transport networks, the concept of a Shared Risk Group (SRG) or (GRP) makes it possible to identify a set of network resources that are associated with a common risk factor. Transmitters distinguish between a plurality of shared risk situations:
 Shared risk link group (SRLG): links sharing a common risk;
 Shared risk node group (SRNG): nodes sharing a common risk;
 Shared risk equipment group (SREG): equipment sharing a common risk.

According to the proposed method, this concept of shared risk is extended to cellular networks, and a GRP may for example be all of the base stations sharing the same mast.

The terminal does not need to know the exact nature of the risk, whether it is on an optical link or on a mast, to use the example above. It is enough for it to know the GRP to which a candidate base station belongs, and to select, for its second attachment, a base station whose GRP is different from that of the base station to which it is already attached.

The GRP may for example be a number determined by the operator responsible for deploying the cellular network.

In order for the terminal to receive the GRPs from the base stations, it is enough to add the GRP to the information normally broadcast repeatedly by a base station to the terminals that are located within the cell covered by the base station. In the prior art, this information is broadcast in System Information Blocks in LTE for example, which comprise for example fields such as PLMN Id (land mobile network identifier, that is to say cellular), Tracking Area Code (subdivision of a cellular network), Cell Id (cell identifier).

According to one aspect of the attachment method, the GRPs are vectors of a dimension greater than 1, and wherein the comparison step comprises a step of calculating the distance between the GRP of the first access point and the GRPs of the other access points of the plurality, one of the other access points being selected if the distance between its GRP and that of the first access point is not zero.

In some implementations, the base stations of the cellular network may belong to a plurality of shared risk groups at the same time, of different levels. For example, a level A group for the mast, a level B group for the optical cable connecting the base station to the collection network, a level C group for the duct or the trench housing the cable, etc. By virtue of this aspect, even if all of the base stations belong to one and the same group of a certain level, a second base station may be selected on the basis of a group at another level that is more differentiating. Preferably, the second base station that is selected is the one that maximizes the distance between its GRP vector and that of the first base station.

It is also possible to use hierarchically nested shared risk groups, for example for small networks such as company networks.

According to one aspect of the attachment method, it comprises a step of transmitting, to one of the first or second access points, a message comprising the GRP identifier of the other access point.

By virtue of this aspect, the second base station knows the GRP identifier broadcast by the first base station and is able to ensure diversity in the choice of the core network equipment involved in the connection of the terminal. To this end, it is enough for the second base station to know the core network equipment associated with the GRP identifier of the first base station. This network equipment may thus be bypassed by the second base station, if possible. The terminal may thus use an existing message such as an attachment request to the second base station, or a response to a connection reconfiguration request from the second base station, by adding the GRP identifier of the first thereto.

According to one aspect of the attachment method, it comprises a step of transmitting a message comprising the received GRP identifiers to the first access point and to the second access point.

By virtue of this aspect, the terminal transmits a message comprising all the GRP identifiers that it has received to the first and the second base station. The terminal may thus use an existing message, such as the measurement report reported by a mobile terminal to the base station to which it is connected in order to prepare for the triggering of a possible "handover", by adding the GRP identifiers thereto.

According to one aspect of the attachment method, the first attachment step and/or the second attachment step comprises a sub-step of receiving a signaling message dedicated to the terminal, comprising an identifier relating to the fact that a core network resource used by the terminal belongs to a shared risk group, called GRPC identifier.

Some shared risk groups are specific to the connection of a terminal to the core network through its attachment to the base station, but are not known by the base station before the attachment of the terminal. The base station therefore cannot broadcast the identifiers of these shared risk groups. This is the case for example for groups identifying an equipment of the core network involved in the connection of a terminal, such as for example a mobility management equipment such as an MME.

By virtue of this aspect, the terminal receives the GRPC identifier and will be able to communicate it to a new base station in a subsequent mobility or attachment step. This base station will be able to make a selection on the basis of this information, with the aim of ensuring diversity in the choice of the core network equipment involved in the connection of the terminal.

The signaling message dedicated to the terminal may be an existing message modified to include one or more GRPC identifiers, such as an attachment response transmitted to a terminal by a base station. One or more GRP identifiers may also be included therein.

According to one aspect of the attachment method, the second attachment step comprises a sub-step of transmitting a signaling message dedicated to the terminal comprising the GRPC identifier.

By virtue of this aspect, the base station selected by the terminal obtains the GRPC and is able to ensure diversity in the choice of the core network equipment used for the connection of the terminal. The signaling message dedicated to the terminal may be an existing message modified to include a GRPC identifier, such as an attachment request transmitted to a base station by a terminal. One or more GRP identifiers may also be included therein.

The various aspects of the attachment method that have just been described are able to be implemented independently of one another or in combination with one another.

The invention also relates to a method for selecting a resource for the multiple attachment of a mobile terminal to access points of a plurality of access points to one or more cellular networks, the method being implemented by one of the access points of the plurality and comprising the following steps:

broadcasting a message to the terminal and to other terminals within the coverage of the access point, comprising an identifier relating to the fact that a resource used by the access point belongs to a shared risk group, called GRP identifier, receiving a message from the terminal comprising a GRP identifier of another access point, selecting a resource for the terminal, on the basis of the GRP identifier of the access point and of the GRP identifier of the other access point.

This method is complementary to the multiple attachment method that has been described above. It allows a base station to have GRP identifiers associated with other base stations. Thus, when a terminal within its coverage and within that of these other base stations requires resource allocation or modification, the base station is able to select a resource so that the resources used for the terminal are distributed in different shared risk groups. This ensures that at least one of the attachments of the terminal will not be affected by the malfunction of the selected resource.

The message from the terminal, comprising the GRP identifier of another base station, may advantageously be an existing message modified to include the GRP identifier, such as for example an attachment request, a reconfiguration request response, or a measurement report.

According to one aspect of the selection method, the message from the terminal furthermore comprises an identifier relating to the fact that a core network resource used by the terminal in association with the other access point belongs to a shared risk group, called GRPC identifier, and wherein this GRPC identifier is taken into account in the selection step.

By virtue of this aspect, the base station obtains the GRPC and is able to maintain diversity in terms of the shared risk groups for the core network equipment used by the connection of the terminal transiting via this base station.

The invention also relates to a device for the multiple attachment of a mobile terminal to access points of a plurality of access points to one or more cellular networks, the device comprising a receiver, a transmitter, a processor and a memory coupled to the processor with instructions intended to be executed by the processor in order to:
  receive messages broadcast by access points of the plurality, comprising an identifier relating to the fact that a resource used by the respective access point belongs to a shared risk group, called GRP identifier,
  perform a first attachment of the terminal to a first access point of the plurality,
  perform a second attachment of the terminal to a second access point of the plurality, selected on the basis of its GRP identifier and of the GRP identifier of the first access point.

This device, which is able to implement the attachment method that has just been described in all of its embodiments, is intended to be implemented in a mobile terminal.

The invention also relates to a device for selecting a resource for the multiple attachment of a mobile terminal to access points of a plurality of access points to one or more cellular networks, the device comprising a receiver, a transmitter, a processor and a memory coupled to the processor with instructions intended to be executed by the processor in order to:
  broadcast a message to the terminal and to other terminals within the coverage of the access point, comprising an identifier relating to the fact that a resource used by the access point belongs to a shared risk group, called GRP identifier,
  receive a message from the terminal comprising a GRP identifier of another access point,
  select a resource for the terminal, on the basis of the GRP identifier of the access point and of the GRP identifier of the other access point.

This device, which is able to implement the selection method that has just been described in all of its embodiments, is intended to be implemented in an access point to a cellular network.

The invention also relates to a computer program comprising instructions for implementing the steps of the attachment method that has just been described when this program is executed by a processor. The invention also targets an information medium able to be read by a mobile terminal and including instructions of a computer program as mentioned above.

The invention also relates to a computer program comprising instructions for implementing the steps of the selection method that has just been described when this program is executed by a processor. The invention also targets an information medium able to be read by an access point to a cellular network and containing instructions of a computer program as mentioned above.

The abovementioned programs may use any programming language, and be in the form of source code, object code, or of intermediate code between source code and object code, such as in a partially compiled form, or in any other desirable form.

The abovementioned information media may be any entity or device capable of storing the program. For example, a medium may include a storage means, such as a ROM, for example a CD-ROM or a microelectronic circuit ROM, or else a magnetic recording means.

Such a storage means may be for example a hard disk, a flash memory, etc.

Moreover, an information medium may be a transmissible medium such as an electrical or optical signal, which may be routed via an electrical or optical cable, by radio or by other means. A program according to the invention may in particular be downloaded from an Internet network.

Alternatively, an information medium may be an integrated circuit in which a program is incorporated, the circuit being designed to execute or to be used in the execution of the methods in question.

4. PRESENTATION OF THE FIGURES

Figure 2:
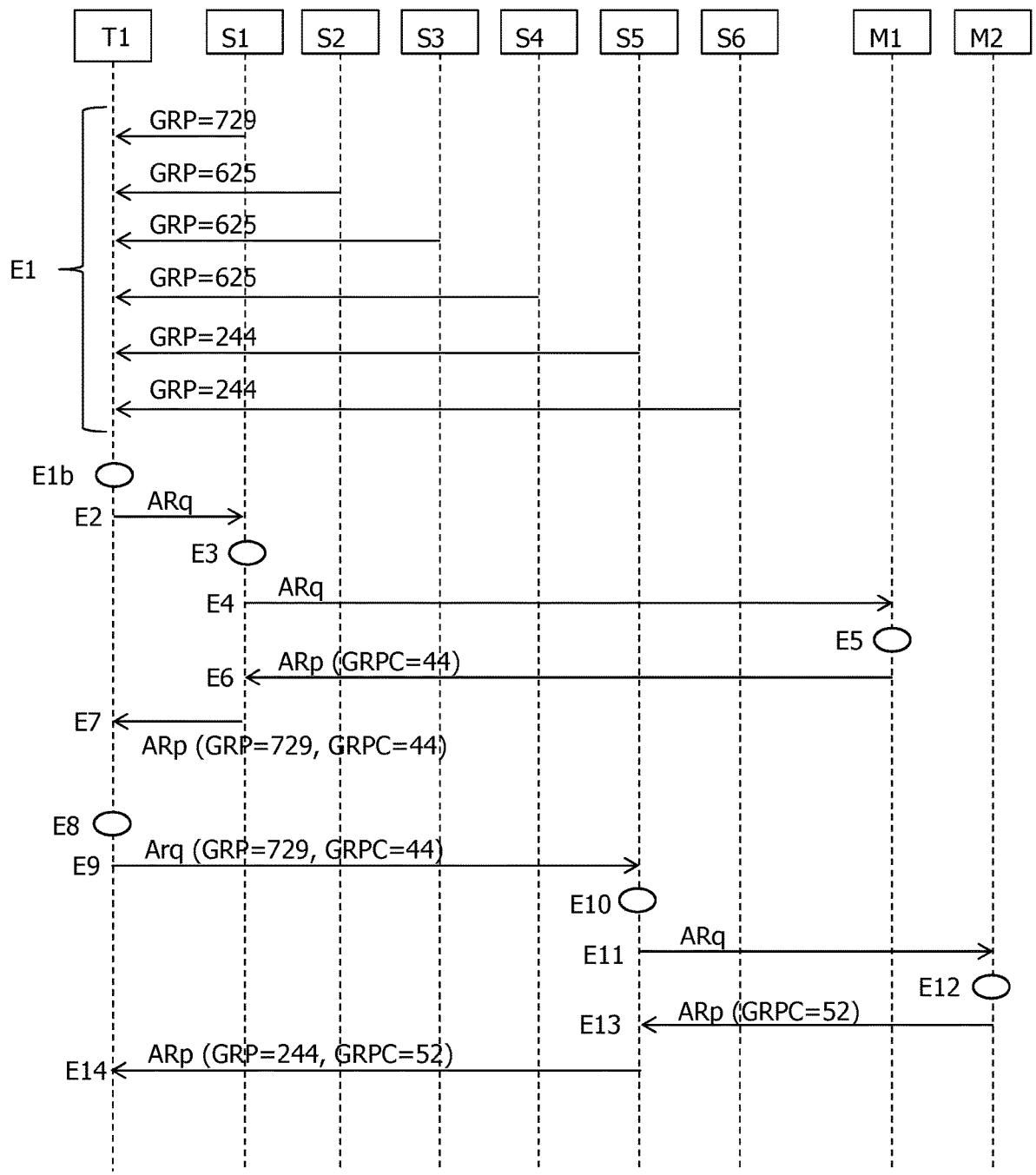
Figure 3:
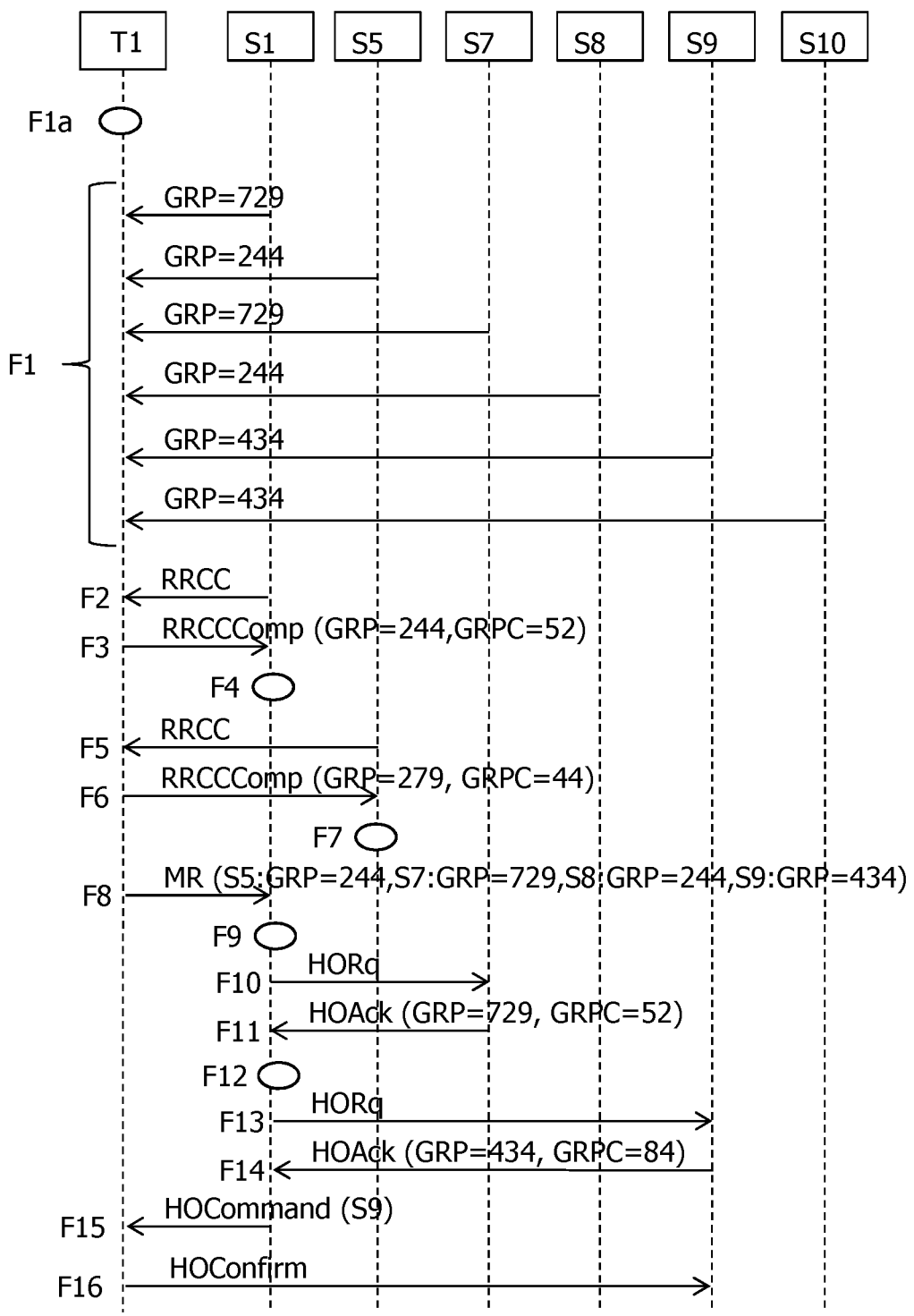
Figure 4:
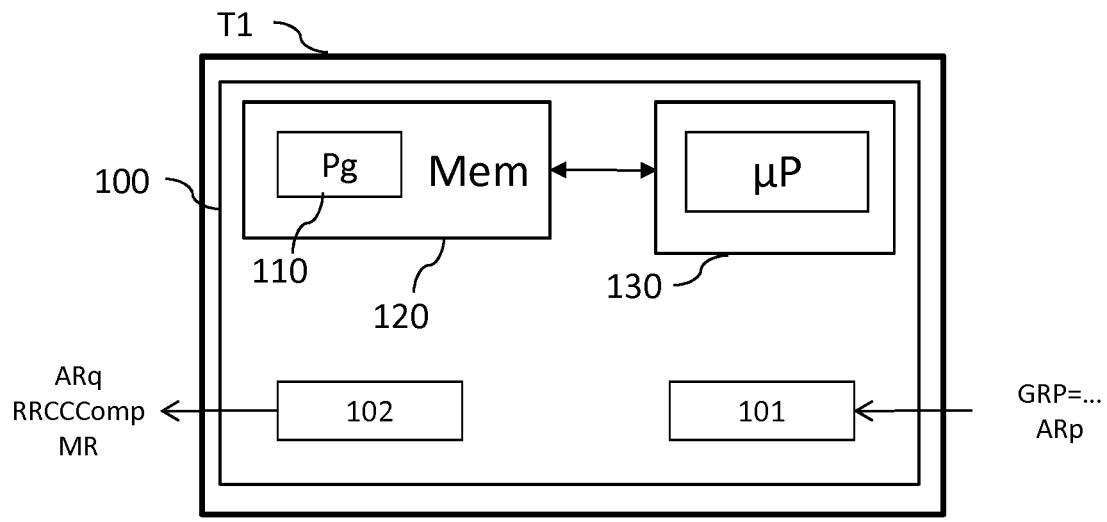
Figure 5:
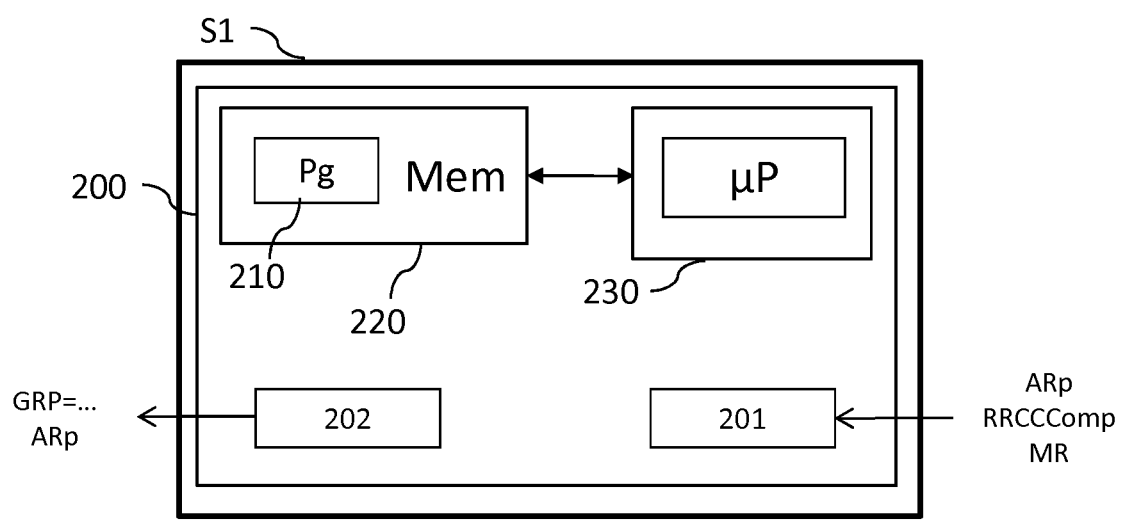

Other advantages and features of the invention will become more clearly apparent from reading the following description of a particular embodiment of the invention, given by way of simple illustrative and nonlimiting example, and the appended drawings, in which:

FIG. 1 schematically shows a cellular network in which the invention is implemented, FIG. 2 shows a flowchart corresponding to the methods for the multiple attachment of a mobile terminal, and for selecting a resource for the multiple attachment of a mobile terminal, according to a first aspect of the invention, FIG. 3 shows a flowchart corresponding to the methods for the multiple attachment of a mobile terminal, and for selecting a resource for the multiple attachment of a mobile terminal, according to other aspects of the invention, FIG. 4 shows the structure of a device for the multiple attachment of a mobile terminal according to one aspect of the invention, FIG. 5 shows the structure of a device for selecting a resource for the multiple attachment of a mobile terminal according to one aspect of the invention.

5. DETAILED DESCRIPTION OF AT LEAST ONE EMBODIMENT OF THE INVENTION

The remainder of the description presents examples of a plurality of embodiments of the invention based on a dual attachment of a mobile terminal to base stations of a cellular network connected to a core network, but the invention also applies to other configurations, such as more than two attachments of one and the same terminal to base stations of a plurality of cellular networks, connected to a plurality of core networks, etc.

FIG. 1 schematically shows a cellular network in which the invention is implemented. Each access point of the cellular network broadcasts, through its radio interface, information characterizing the fact that this access point or the cell belongs to a shared risk group, or GRP. The GRP may for example be an integer determined for each access point by the individuals responsible for deploying the network.

According to the invention, each access point provides a GRP in a system information message (such as SIB—System Information Block in 4G) that is broadcast in the cell, which already contains information such as PLMN ID, TAC (Tracking Area Code), Cell ID, etc.

FIG. 1 shows a mobile terminal T1 receiving the signals from 6 access points, in this case base stations, S1 to S6, which may be BTSs of a 2G network, NodeBs of a 3G network, eNodeBs of a 4G network, gNBs of a 5G network, or any other access point to a wireless network. These access points may be of different types. These access points are connected to one (or more) core network(s) CN (in the broad sense, may include BSC (2G) and RNC (3G)) by links that are able to share one and the same optical fiber OF1, OF2 or OF3. In this example, the access points that share one and the same optical fiber broadcast the same GRP, such as for example the base stations S5 and S6 which broadcast a GRP with the value 244 corresponding to the optical fiber OF3. The terminal T1 may thus implement dual attachment to two access points that do not share the same optical fiber, thereby protecting it from a loss of connectivity in the event of an optical fiber outage, by choosing two access points broadcasting different GRPs.

This same scheme applies to civil engineering components (antennas, ducts, chambers), to the sheaths protecting an optical fiber assembly, and to penetration elements in a building or center.

The scheme may also be applied to the elements of a splitter or to a PON splitter (FTTH GPON, XGS-PON, NGPON2 distribution networks).

The scheme may take into account other technologies for the connections:
  microwave (point-to-point or point-to-multipoint configuration),
  xDSL on copper medium.

One variant has a similar implementation in which the diversity of the risks in the core network CN is also taken into account: the access points S1 to S6 which share one and the same core network equipment broadcast the same GRP. The terminal T1 will then make a different selection of access points and will be protected from a loss of connectivity not only in the event of an optical fiber outage but also in the event of failure of a core network equipment. It is obviously possible to expand the cases that are presented by taking into account, in the definition of the GRPs, not one or two but any number of elements in the chain of resources (equipment, links, infrastructure, etc.) implemented in order to provide connectivity to the terminal.

The access point may therefore provide not one but a plurality of GRPs, for example a first GRP associated with the risks in the access network and a second GRP associated with the risks in the core network. This makes it possible to take more complex configurations into account, as illustrated in FIG. 1.

A GRP is not always provided to the terminal in a system information message broadcast in the cell by the access point; it may also be provided to the terminal in a dedicated signaling message between the terminal and the access point. The advantage is that, if some elements of the core network CN are selected on the basis of the identity of the terminal, then the GRP may be provided taking this into account. Various terminals will thus be able to receive various GRPs from the same access point, because they have been assigned various equipment in the core network. The drawback is that the terminal does not know the GRP before initiating its attachment. It is for this reason that it is necessary to distinguish between GRPs able to be broadcast by the access point before a first attachment of the terminal and GRPs that the terminal is able to obtain only after a first attachment to the access point. These are called GRPC (C for "core") in the remainder of the document. For example, when it attaches to the access point S1, the terminal obtains the value GRPC=44 in a dedicated signaling message, because the core network element associated with the terminal T1 is the element M1, which is for example an MME, that is to say a mobility management equipment, and this element M1 forms part of the shared risk group identified by GRPC=44.

The GRPs are thus provided in a system information message broadcast in the cell by the access points S1 to S6, and the GRPCs are provided in a signaling message dedicated to the terminal T1.

The terminal does not know the GRPC before initiating its first attachment, but this drawback may be overcome in its second attachment. Specifically, the terminal, which already has a first attachment to the network and which initiates a second attachment, may provide the GRPs and the GRPCs received for the first attachment. Thus, when the network has a possible choice in the elements to be used for this attachment ("backhaul" optical link, core network equipment, etc.), the network element responsible for this selection may take into account the GRP and the GRPC already used by the terminal and make the selection so as to obtain a different GRP and/or GRPC for the second attachment. To continue with the above example, if the terminal T1 attaches to the access point S5 for a second attachment to the cellular network, S5 having been selected because its GRP=244 is different from the GRP=279 of the first attachment (corresponding respectively to the separate optical links OF3 and OF1), the terminal T1 provides the access point S5 with the GRPC obtained from the access point S1. Thus, in order to manage the second attachment of the terminal T1, an MME other than M1 may be chosen, M2 for example, and therefore the GRPC=52 is different from the GRPC=44 of the access point S1.

FIG. 2 shows a flowchart corresponding to the methods for the multiple attachment of a mobile terminal, and for selecting a resource for the multiple attachment of a mobile terminal, according to a first aspect of the invention.

The terminal T1 is within the radio coverage of the base stations S1 to S6 of a cellular network, thereby allowing it to receive a system information message from each of them at more or less regular intervals. The broadcasting of at least one of these messages by a base station, and reception thereof by the terminal T1, is shown schematically by step E1. According to one aspect of the invention, such a system information message comprises, in addition to the usual information, a shared risk group identifier GRP corresponding to an optical fiber link connecting the respective base station to the core network CN. Step E1 may be incomplete in that some of the base stations may not have broadcast their system information message by the time step E8 begins. In this case, only the base stations that have broadcast their system information message at least once will be taken into account from step E8.

In a step E1b, the terminal T1 selects the base station S1 for a first attachment. The selection for this first attachment may be made using a known method. The terminal T1 may store the value GRP=729 corresponding to the base station S1.

In a step E2, using a known technique, the terminal T1 transmits an attachment request ARq to the base station S1.

In a step E3, using a known technique, the base station S1 selects the MME M1 in the core network CN as mobility management equipment for the attachment of the terminal T1.

In a step E4, using a known technique, the base station S1 transmits an attachment request ARq to the MME M1.

In a step E5, using a known technique, the procedure for the attachment of the terminal T1 is processed in the core network CN by the MME M1.

In a step E6, an attachment response ARp is transmitted to the base station S1 by the MME M1. According to one aspect of the invention, this response ARp comprises, in addition to the usual information, a core network shared risk group identifier GPRC corresponding to the MME equipment M1. In this case, the parameter GRPC with the value 44 is contained in the response ARp.

In a step E7, an attachment response ARp is transmitted to the base station T1 by the base station S1. According to one aspect of the invention, this response ARp comprises, in addition to the usual information, the parameter GRPC with the value 44. This response ARp possibly also comprises the parameter GRP with the value 729 corresponding to the base station S1, which is useful if the terminal T1 did not store this GRP in step E1b. In a step E8, the terminal T1 selects a base station for a second attachment to the cellular network. This second attachment may coexist with the first, that is to say that it does not lead to the release of the first attachment. According to one aspect of the invention, the terminal T1 uses the GRPs broadcast by the base stations S1 to S6 and received in step E1 to select a second base station whose GRP is different from that of the base station S1 already being used for the first attachment. The terminal T1 selects the base station S5 since its GRP=244, which is different from the station S1 with its GRP=279. The risks specific to the optical links connecting the base stations S1 and S5 to the core network are thus distributed over 2 separate links, OF1 and OF3. The terminal T1 does not need to know exactly to what the GRP corresponds. If a plurality of shared risk groups are organized for the base stations S1 to S6, for example a GRP, GRP-1 for example for the optical link and another GRP, GRP-2 for example for the mast bearing the antennas, it is enough for the terminal to be able to distinguish between them by their name, GRP-1 or GRP-2, without one of these names indicating the nature of the resource whose risks are shared.

In a step E9, the terminal T1 transmits an attachment request ARq to the base station S5. According to one aspect of the invention, the request ARq comprises, in addition to the usual information, the parameter GRP with the value 279, that is to say the GRP of the first attachment to the base station S1. Advantageously, the request ARq also comprises the parameter GRPC with the value 44, that is to say the GRPC of the first attachment to the base station S1.

In a step E10, the base station S5 selects an MME in the core network CN as mobility management equipment for the attachment of the terminal T1. By virtue of the request ARq received in step E9, the base station S5 knows the GRPC already being used by the terminal T1 for its first attachment to the base station S1, that is to say GRPC=44. Having the choice between the MMEs M1 and M2, the base station S5 then selects the MME M2 because its GRPC whose value is 52 is different. The risks specific to the MMEs connected to the base stations S1 and S5 are thus distributed over 2 separate MMEs.

In a step E11, using a known technique, the base station S5 transmits an attachment request ARq to the MME M2.

In a step E12, using a known technique, the procedure for the second attachment of the terminal T1 is processed in the core network CN by the MME M2.

In a step E13, an attachment response ARp is transmitted to the base station S5 by the MME M2. According to one aspect of the invention, this response ARp comprises, in addition to the usual information, a GRPC with the value 52 is contained in the response ARp.

In a step E14, an attachment response ARp is transmitted to the terminal T1 by the base station S5. According to one aspect of the invention, this response ARp comprises, in addition to the usual information, the parameter GRPC with the value 52. This response ARp possibly also comprises the parameter GRP with the value 244 corresponding to the base station S5, which is useful if the terminal T1 did not associate this GRP value with the base station S5 in step E8.

If the terminal T1 wishes to implement a third attachment, steps E8 to E14 may be repeated. Upon new instances of steps E8, E9 and E10, the GRPs and GRPCs of all of the previous attachments are taken into account.

FIG. 3 shows a flowchart corresponding to the methods for the multiple attachment of a mobile terminal, and for selecting a resource for the multiple attachment of a mobile terminal, according to other aspects of the invention.

The above description relates to the initial selection of base stations (that is to say of cells, or more generally of access points) in order to implement dual (or multiple) attachment of the terminal T1. Once the terminal is thus attached, it is liable to change cells, in particular due to its mobility, for example in a step F1a. Following this step F1a, the terminal T1 is located within the coverage of the base stations S1, S5, S7, S8, S9 and S10. It is no longer within the coverage of the cells S2, S3, S4 or S6.

In "standby" mode (without active communication), according to the prior art in cellular networks, the terminal selects a new base station autonomously using the information broadcast by the base stations within whose coverage it is located and the signal level of each of these base stations, and only signals itself to the network if the new selected base station broadcasts location area information about areas other than those in which it is registered; if not, the terminal makes do with continuing to listen to this base station, and it is said to "camp" on it. In the context of the invention, the terminal will do the same for each of its base stations, attachment points, and will also use the GRPs broadcast by these base stations in order to always (as far as possible) camp on two (or more) cells broadcasting different GRPs.

For the "connected" mode cell changeover (with active communication), according to the prior art in cellular networks, the base station communicates a list of neighboring cells to the terminal, the terminal periodically performs measurements on these cells and reports the results back to its base station; the latter makes the decision to perform a "handover" and decides on the target cell. In the context of the invention, the terminal may be in connected mode with each of the cells via which it is attached in order to be able, in the event of failure of one of these cells, to immediately use the others for active communication flows. Each of the base stations will ensure (as far as possible) that the target cells for the "handovers" are chosen so as to keep the diversity of the GRPs, and of the GRPCs if necessary. To this end, the terminal informs each of the base stations that it is using of the GRPs and GRPCs associated with the other attachment base stations that it is using (for example by indicating it in one of the signaling messages used to change to connected mode (for example RRCConnectionReconfigurationComplete in 4G)). Furthermore, in a variant H1, the terminal adds the GRPs broadcast by the measured cells to the measurement report messages ("MeasurementReport"). Otherwise, in a variant H2, the base station may be configured so as to know the GRPs of neighboring cells, or else, in a variant H3, to ask them for it in a "handover" preparation message; in the latter case, the drawback is that the information is obtained after having selected a target cell and it is therefore potentially necessary to try a plurality of candidates, but the advantage is that the GRPs that are not broadcast are able to be taken into account. These variants may advantageously be combined, in particular H1 and H3 when GRPs are provided in a system information message broadcast in the cell and GRPCs are provided in a dedicated signaling message between the terminal and the base station.

Steps F2 to F7 illustrate the case in which the terminal T1 returns to connected mode after having been in standby mode. Leaving standby mode may be requested by the terminal to the base station in a step that is not illustrated, or may be triggered by a "paging" message sent to the terminal by the base station.

In a step F2, using a known technique, the terminal T1 receives a connection reconfiguration message RRCConnectionReconfiguration from the base station S1.

In response, in a step F3, the terminal T1 transmits a message RRCConnectionReconfigurationComplete to the base station S1 indicating that its reconfiguration is complete, this message comprising the GRP and the GRPC relating to the second attachment of the terminal T1, that is to say the attachment to the base station S5.

In a step F4, the base station S1 stores the GRP and the GRPC received in relation to the terminal T1, in order to be able to select, if necessary, a new base station with different GRP and GRPC values.

In a step F5, using a known technique, the terminal T1 receives a connection reconfiguration message RRCConnectionReconfiguration from the base station S5.

In response, in a step F6, the terminal T1 leaves standby mode and transmits a message RRCConnectionReconfigurationComplete to the base station S5 indicating that its reconfiguration is complete, this message comprising the GRP and the GRPC relating to the first attachment of the terminal T1, that is to say the attachment to the base station S1.

In a step F7, the base station S5 stores the GRP and the GRPC received in relation to the terminal T1, in order to be able to select, if necessary, a new base station with different GRP and GRPC values.

Only one of the groups of steps F2 to F4 and F5 to F7 may be executed, for example if the terminal T1 was in standby mode on only one of its two attachments.

Steps F8 to F16 illustrate the performance of a "handover" from one of the 2 base stations for the attachment of the terminal T1, in this case from the base station S1.

In a step F8, the terminal T1 reports to the base station S1 all of the measurements that it has performed on the signals received from the base stations within whose coverage it is located and whose signal strength is greater than a determined threshold. In this case, following the movement of the terminal T1, these are the base stations S5 (to which it is still attached), S7, S8 and S9. The signals from the stations S1 and S10 are too weak. According to one aspect of the invention, the terminal T1 adds the respective GRPs of the base stations to the measurement message, that is to say the values S5: GRP=244, S7: GRP=729, S8: GRP=244, S9: GRP=434. The base station S1, which has to prepare a "handover" for the terminal T1 since its signal has become too weak, thus knows the GRPs of the candidate base stations for this "handover", in addition to the characteristics of their signals.

In a step F9, the base station S1 selects a base station from among the candidates. The base stations S5 and S8 are excluded because their GRP=244 is already being used on the second attachment of the terminal T1. The base station S1 then selects the base station S7, whose GRP=729 is admittedly identical to that of the base station S1, but the terminal T1 will no longer be attached to the station S1 following the "handover".

In a step F10, using a known technique, the base station S1 transmits a request HandoverRequest to the base station S7.

In one variant according to the invention, this request comprises the GRPC=44 of the base station S1, thereby allowing the base station S7, if it has the choice between a plurality of MMEs, not to select an MME belonging to this GRPC.

In a step F11, the base station S7 transmits a response HandoverAcknowledgement to the base station S1, which, according to one aspect of the invention, comprises the GRP=729 and the GRPC=52 of the base station S7, in addition to the usual information.

In a step F12, the base station S1 detects that the GRPC=52 is already being used in another attachment of the terminal T1, for example by virtue of the information received in step F3. The base station S7 is therefore not a good candidate for the "handover" and the base station S1 instead selects the base station S9. The base station S1 could not know the GRPC of the base station S7 in advance because the GRPC is not broadcast by the base stations in their system information messages (step F1).

In a step F13, using a known technique, the base station S1 transmits a request HandoverRequest to the base station S9.

In a step F14, the base station S9 transmits a response HandoverAcknowledgement to the base station S1, which, according to one aspect of the invention, comprises the GRP=434 and the GRPC=84 of the base station S9, in addition to the usual information.

The base station S1 no longer detects any GRPC that is already being used and, in a step F15, it transmits a message Handover Command to the terminal T1 using a known technique.

In a step F16, using a known technique, the terminal T1 performs the "handover" and transmits a message HandoverConfirm to the base station S9. The "handover" procedure is then completed.

With reference to FIG. 4, what is now shown is one example of the structure of a device for the multiple attachment of a mobile terminal, according to one aspect of the invention. The attachment device 100 implements the method for the multiple attachment of a mobile terminal to access points of a plurality of access points to one or more cellular networks, various embodiments of which have just been described.

Such a device 100 may be implemented in a mobile terminal T1.

For example, the device 100 comprises a receiver 101, a transmitter 102, a processing unit 130, equipped for example with a microprocessor pP, and controlled by a computer program 110, stored in a memory 120 and implementing the attachment method according to the invention. On initialization, the code instructions of the computer program 110 are for example loaded into a RAM memory, before being executed by the processor of the processing unit 130.

Such a memory 120 and such a processor of the processing unit 130 are able and configured so as to:
  obtain, through the receiver, messages broadcast by access points of the plurality, comprising an identifier relating to the fact that a resource used by the respective access point belongs to a shared risk group, called GRP identifier,
  perform a first attachment of the terminal to a first access point of the plurality,
  perform a second attachment of the terminal to a second access point of the plurality, selected on the basis of its GRP identifier and of the GRP identifier of the first access point.

Advantageously, the processing unit 130 is also able and configured so as to:
  compare the GRP identifier of the first access point and the GRP identifiers of the other access points of the plurality, one of the other access points being selected as the second access point if its GRP identifier is different from that of the first access point,
  have the transmitter transmit, to one of the first or second access points, a message comprising the GRP identifier of the other access point, or even all of the received GRP identifiers,
  obtain, through the receiver, a signaling message dedicated to the terminal, comprising an identifier relating to the fact that a core network resource used by the terminal belongs to a shared risk group, called GRPC identifier,
  have the transmitter transmit a signaling message dedicated to the terminal comprising the GRPC identifier.

With reference to FIG. 5, what is now shown is an example of the structure of a device for selecting a resource for the multiple attachment of a mobile terminal, according to one aspect of the invention.

The selection device 200 implements the method for selecting a resource for the multiple attachment of a mobile terminal to access points of a plurality of access points to one or more cellular networks, various embodiments of which have just been described.

Such a device 200 may be implemented in an access point to a cellular network, such as for example a base station S1.

For example, the device 200 comprises a receiver 201, a transmitter 202, a processing unit 230, equipped for example with a microprocessor µP, and controlled by a computer program 210, stored in a memory 220 and implementing the selection method according to the invention. On initialization, the code instructions of the computer program 210 are for example loaded into a RAM memory, before being executed by the processor of the processing unit 230.

Such a memory 220 and such a processor of the processing unit 230 are able and configured so as to:
  have the transmitter broadcast a message to the terminal and to other terminals within the coverage of the access point, comprising an identifier relating to the fact that a resource used by the access point belongs to a shared risk group, called GRP identifier,
  obtain, through the receiver, a message from the terminal comprising a GRP identifier of another access point,
  select a resource for the terminal, on the basis of the GRP identifier of the access point and of the GRP identifier of the other access point.

Advantageously, the processing unit 230 is also able and configured so as to:
  obtain, through the receiver, a message from the terminal comprising an identifier relating to the fact that a core network resource used by the terminal in association with the other access point belongs to a shared risk group, called GRPC identifier, and wherein this GRPC identifier is taken into account in the selection step.

It is understood that the invention makes it possible, for a mobile terminal attached to a plurality of base stations at the same time of one or more cellular networks, to distribute the resources used by the terminal in different shared risk groups, even if the terminal is in a mobility situation, enters and leaves standby, or performs one or more "handovers".

The invention claimed is:

1. A method for multiple attachment of a mobile terminal to access points of a plurality of access points to one or more cellular networks, the method being implemented by the terminal and comprising:
  receiving messages broadcast by access points of the plurality, comprising an identifier representing that a resource used by the respective access point belongs to a shared risk group, called a GRP identifier,
  performing a first attachment of the terminal to a first access point of the plurality, and
  performing a second attachment of the terminal to a second access point of the plurality, selected on the basis of the GRP identifier of the second access point and of the GRP identifier of the first access point.

2. The method as claimed in claim 1, furthermore comprising comparing the GRP identifier of the first access point and the GRP identifiers of the other access points of the plurality, one of the other access points being selected as the second access point if its GRP identifier is different from that of the first access point.

3. The method as claimed in claim 2, wherein the GRPs are vectors of a dimension greater than 1, and wherein the comparing comprises calculating a distance between the GRP of the first access point and the GRPs of the other access points of the plurality, one of the other access points being selected if the distance between its GRP and that of the first access point is not zero.

4. The method as claimed in claim 1, comprising transmitting, to one of the first or second access points, a message comprising the GRP identifier of the other access point.

5. The method as claimed in claim 1, comprising transmitting a message comprising the received GRP identifiers to the first access point and to the second access point.

6. The method as claimed in claim 1, wherein the first attachment and/or the second attachment comprises receiving a signaling message dedicated to the terminal, comprising an identifier representing that a core network resource used by the terminal belongs to a shared risk group, called GRPC identifier.

7. The method as claimed in claim 6, wherein the second attachment comprises transmitting a signaling message dedicated to the terminal comprising the GRPC identifier.

8. A method for selecting a resource for multiple attachment of a mobile terminal to access points of a plurality of access points to one or more cellular networks, the method being implemented by one of the access points of the plurality and comprising:
  broadcasting a message to the terminal and to other terminals within coverage of the access point, comprising an identifier representing that a resource used by the access point belongs to a shared risk group, called a GRP identifier, receiving a message from the terminal comprising the GRP identifier of another access point, and selecting a resource for the terminal, on the basis of the GRP identifier of the access point and of the GRP identifier of the other access point.

9. The method as claimed in claim 8, wherein the message from the terminal furthermore comprises an identifier representing that a core network resource used by the terminal in association with the other access point belongs to a shared risk group, called GRPC identifier, and wherein this GRPC identifier is taken into account in the selecting.

10. A device for multiple attachment of a mobile terminal to access points of a plurality of access points to one or more cellular networks, the device comprising:

a receiver, a transmitter, a processor; and a memory coupled to the processor with instructions stored thereon which when executed by the processor configure the device to:

receive messages broadcast by access points of the plurality, comprising an identifier representing that a resource used by the respective access point belongs to a shared risk group, called a GRP identifier, perform a first attachment of the terminal to a first access point of the plurality, and perform a second attachment of the terminal to a second access point of the plurality, selected on the basis of the GRP identifier of the second access point and of the GRP identifier of the first access point.

11. A device for selecting a resource for multiple attachment of a mobile terminal to access points of a plurality of access points to one or more cellular networks, the device comprising:

a receiver, a transmitter, a processor; and a memory coupled to the processor with instructions stored thereon which when executed by the processor configure the device to:

broadcast a message to the terminal and to other terminals within coverage of the access point, comprising an identifier representing that a resource used by the access point belongs to a shared risk group, called a GRP identifier, receive a message from the terminal comprising a GRP identifier of another access point, and select a resource for the terminal, on the basis of the GRP identifier of the access point and of the GRP identifier of the other access point.

12. A non-transitory computer-readable information medium containing instructions of a computer program which when executed by a processor of a mobile terminal configure the terminal to perform a multiple attachment of the terminal to access points of a plurality of access points to one or more cellular networks, which comprises:

receiving messages broadcast by access points of the plurality, comprising an identifier representing that a resource used by the respective access point belongs to a shared risk group, called a GRP identifier, performing a first attachment of the terminal to a first access point of the plurality, and performing a second attachment of the terminal to a second access point of the plurality, selected on the basis of the GRP identifier of the second access point and of the GRP identifier of the first access point.

13. A non-transitory computer-readable information medium containing instructions of a computer program which when executed by a processor of an access point of a plurality of access points to one or more cellular networks, configure the access point to select a resource for multiple attachment of a mobile terminal to other access points of the plurality of access points, which comprises:

broadcasting a message to the terminal and to other terminals within coverage of the access point, comprising an identifier representing that a resource used by the access point belongs to a shared risk group, called a GRP identifier, receiving a message from the terminal comprising the GRP identifier of another access point, and selecting a resource for the terminal, on the basis of the GRP identifier of the access point and of the GRP identifier of the other access point.

* * * * *